(12) United States Patent
Nazari et al.

(10) Patent No.: US 11,829,608 B2
(45) Date of Patent: Nov. 28, 2023

(54) ADAPTIVE ADJUSTMENT OF RESYNCHRONIZATION SPEED

(71) Applicant: Nebulon, Inc., Fremont, CA (US)

(72) Inventors: Siamak Nazari, Mountain View, CA (US); Anil Swaroop, Danville, CA (US); Srinivasa Murthy, Cupertino, CA (US)

(73) Assignee: Nebulon, Inc., Fremont, CA (US)

( * ) Notice: Subject to any disclaimer, the term of this patent is extended or adjusted under 35 U.S.C. 154(b) by 0 days.

(21) Appl. No.: 17/695,486

(22) Filed: Mar. 15, 2022

(65) Prior Publication Data

US 2022/0291846 A1  Sep. 15, 2022

Related U.S. Application Data

(60) Provisional application No. 63/161,078, filed on Mar. 15, 2021.

(51) Int. Cl.
*G06F 12/00* (2006.01)
*G06F 3/06* (2006.01)

(52) U.S. Cl.
CPC ............ *G06F 3/0619* (2013.01); *G06F 3/065* (2013.01); *G06F 3/067* (2013.01)

(58) Field of Classification Search
None
See application file for complete search history.

(56) References Cited

U.S. PATENT DOCUMENTS

2020/0195717 A1\* 6/2020 Martin ................ H04L 67/1097
2022/0083433 A1\* 3/2022 Saad ................... G06F 11/1448

\* cited by examiner

*Primary Examiner* — Daniel D Tsui
(74) *Attorney, Agent, or Firm* — David Millers

(57) ABSTRACT

A resynchronization operation (300) adapts according to activity histories (148) within a storage platform (100). An owner node (A) and a backup storage node (B) may track activity such as the IO operations begun and use recent activity to determine respective amounts of data the owner (A) and backup (B) can expect to process without unacceptably degrading storage services. The owner (A) transfer resynchronization data in chunks, each having a size limited by the current amounts the owner (A) and backup (B) determined from current activity. When activity is low or idle, large chunks may be sent to quickly complete resynchronization, while a busy system uses smaller chunks such that the system performance is not adversely affected.

12 Claims, 3 Drawing Sheets

ADAPTIVE ADJUSTMENT OF RESYNCHRONIZATION SPEED

BACKGROUND

Many storage platforms may have volumes that are mirrored to provide redundancy. For example, a clustered storage platform may have one storage node that owns a mirrored volume and maintains a primary copy of the data associated with the mirrored volume, while another storage node in the platform maintains a backup copy of the data associated with the mirrored volume. This arrangement provides redundancy for the mirrored volume because the backup storage node can take ownership of the mirrored volume and provide storage services for the mirrored volume if the original owner of the mirror volume becomes unavailable.

The owner and the backup for a storage volume generally need to be synchronized so that the primary copy and the backup copy of the storage volume are the same and the backup can assume ownership of the volume without loss of data. However, when the owner or the backup storage node fails or becomes unavailable, the surviving node, which is then the sole owner of the storage volume, can accumulate changes to the storage volume that are not reflected on the backup. When the unavailable storage node becomes available again, the returning storage node may undertake to back up the mirrored storage volume, and a resynchronization operation may be needed to ensure the backup volume contains the same data as the primary volume. Another case where resynchronization is an issue occurs when a backup storage node is newly installed or newly configured to maintain a backup of a pre-existing primary volume. When a new backup is assigned or when a node fails and then returns to service as a backup, the owner storage node may have accumulated many data changes that need to be sent to the backup storage node to complete a resynchronization operation ensuring the backup volume contains the same data as the primary volume. Processing the accumulated data changes can be a burden on both the owner and backup storage nodes and may result in clients of the storage platform seeing a degradation in the performance of their service requests.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

In accordance with an aspect of the current disclosure, storage processors in storage nodes track service requests that the storage processors are processing or have processed and determine one or more activity metrics. As an example, each storage processor can count the numbers of the begun or completed read and write operations that occur in a series of temporal buckets. Each storage node, for example, may track storage operations that the storage processor began during the last second, the last 5 seconds, and the last 30 seconds. A backup node may use a current value of its activity metric to select a quantity or amount of resynchronization data that the backup node can process while maintaining a desired level of service to clients, and then the backup node may request that the owner node transfer the selected amount resynchronization data. The owner node can similarly use a current value of its activity metric to select a quantity or amount of resynchronization data that the owner node can process while maintaining a desired level of service to clients and can transmit to the backup node a chunk of resynchronization data having a size limited by the amounts of data the backup and owner nodes selected. The entirety of the resynchronization data may thus be transmitted to the backup node in a series of chunks having different sizes depending on the activity, e.g., processing load, in the storage platform at the times when the chunks are transferred. With such processes, a storage platform can complete a resynchronization operation very quickly if the owner and backup are idle and can prevent the resynchronization operation from adversely affecting service performance for clients when the storage platform is busy.

Figure 1:
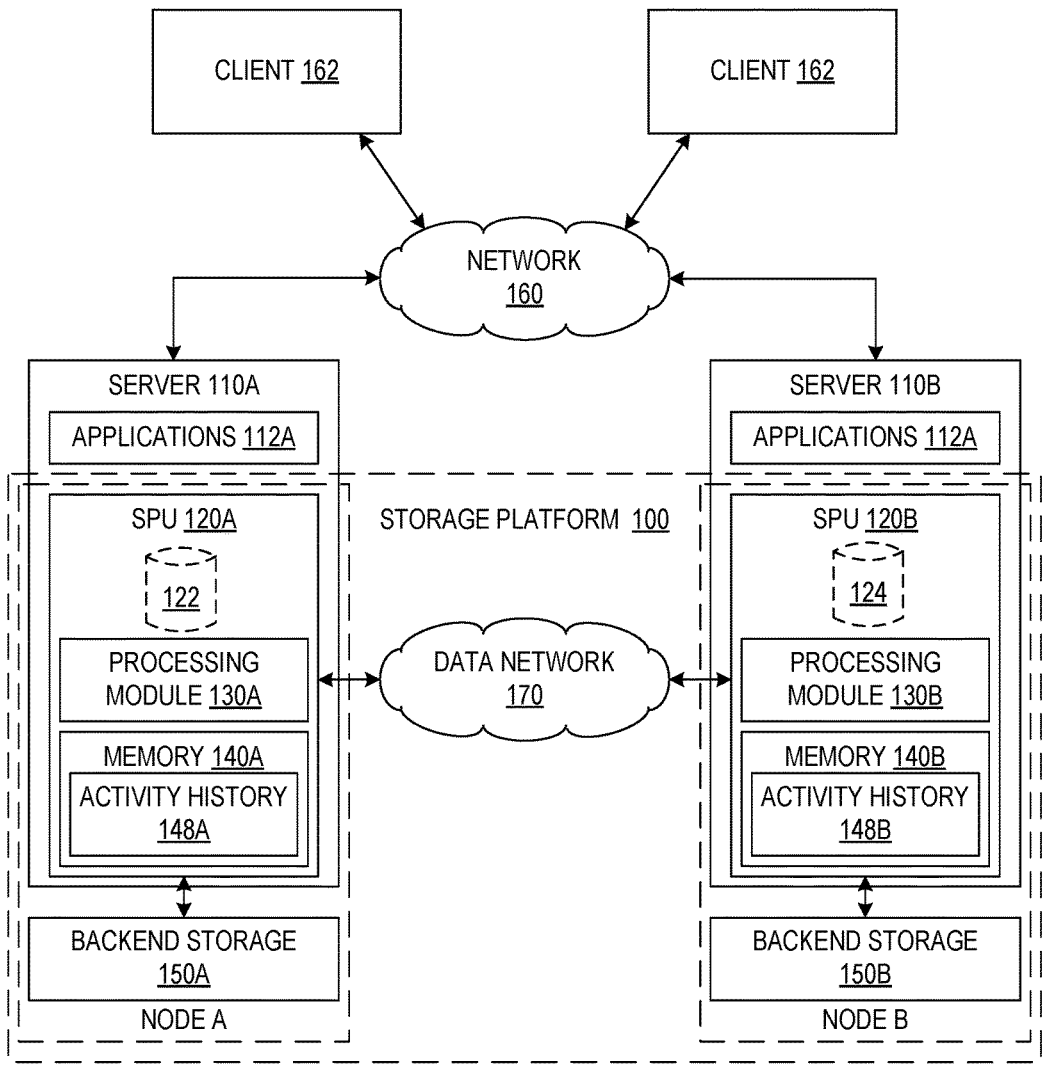
FIG. 1 is a block diagram showing a system including a storage platform in accordance with an example of the present disclosure.

Storage systems may employ mirroring as one method for providing redundancy in a storage system, and FIG. 1 shows a storage system 100 in accordance with an example of the present disclosure that provides redundancy through mirroring of a storage object such as a virtual volume 122. Storage system 100 employs multiple servers 110A to 110B with resident storage processing units (SPUs) 120A and 120B to provide storage services. Each server 110A or 110B may be a conventional server or computer system. Storage platform 100 in the example of FIG. 1 shows a simple system including only two servers 110A and 110B and only two SPUs 120A and 120B implementing two storage nodes A and B, but more generally storage system 100 could include any number of servers and SPUs implementing any number of storage nodes.

Each SPU 120A or 120B may be a card or other device that is installed or resident within its host server 110A or 110B. Each SPU 120A or 120B includes a processing module 130A or 130B that executes operations to control backend storage 150A or 150B and provide storage services, e.g., reading or writing of blocks of data of virtual volumes. In the illustrated example, storage platform 100 presents virtual a volume 122 to storage clients such as applications 112A and 112B running on servers 110A and 110B or clients 162 connected through a client network 160 to servers 110A and 110B. The storage clients may generate service requests, e.g., read or write requests, that target a data block or page at a location in virtual volume 122, and SPU 120A may perform operations to control backend storage 150A as needed to fulfil the service request targeting virtual volume 122.

Backend storage 150A or 150B, which SPUs 120A and 120B respectively control, may include one or more storage devices installed in servers 110A or 110B or one or more external storage devices directly connected to an SPU 120A or 120B. Backend storage 150A or 150B may employ, for example, hard disk drives, solid state drives, or other non-volatile storage devices or media in which data may be physically stored, and backend storage 150 particularly may have a redundant array of independent disks (RAID) 5 or 6 configuration for performance and redundancy.

Storage platform 100 further includes a data network 170 that SPUs 120A and 120B use when communicating with each other or with other SPUs (not shown), e.g., when providing storage services. Alternatively, nodes of storage network 100 could communicate with each other through the same network 160 used by storage clients 162.

FIG. 1 illustrates an example in which SPU 120A owns primary volume 122 and SPU 120B maintains a backup volume 124, which is a storage object intended to replicate primary volume 122. Accordingly, SPUs 120A and 120B are sometimes referred herein to owner 120A and backup 120B and as being in a replication relationship with respect to volume 122. More generally, each SPU 120A or 120B may maintain zero, one, or multiple primary virtual volumes that storage clients 162 can use, and each of those primary volumes may be mirrored or unmirrored, i.e., may or may not have a backup volume maintained elsewhere in storage platform 100.

In accordance with an aspect of the current disclosure, each SPU 120A or 120B maintains an activity history 148A or 148B in memory 140A or 140B of the SPU 120A or 120B. Storage processors 120A and 120B use their respective activity histories 148A and 148B to track the storage operations, e.g., read and write operations, that SPUs 120A and 120B have recently begun. Activity history 148A or 148B may, for example, contain counts of IO operations that SPU 120A or 120B began in different time periods or buckets, e.g., during the last second, during the last 5 seconds, and during the last 30 seconds. As described further below, SPUs 120A and 120 B may use activity histories 148A and 148B to adapt or adjust of the speed of resynchronization processes to minimize the impact that resynchronization has on performance of storage services for storage clients such as clients 162 or applications 112A and 112B.

SPU 120A and 120B in the example of FIG. 1 are separate devices in separate servers 110A and 110B, so that primary volume 122 and backup volume 124 are maintained by separate storage nodes A and B having separate hardware. In this configuration of storage platform 100, all storage requests that target virtual volume 122 are sent to the owner 120A of virtual volume 122. Owner 120A processes each service request targeting volume 122, e.g., by returning one or more blocks of data from target locations in volume 122 in response to a read request or storing data in target locations of volume 122 in response to a write request. When owner 120A performs a service request that changes primary volume 122, backup 120B needs to make the same changes to backup volume 124, and owner 120A may accordingly send data and instructions to backup SPU 120B that enable the backup 120B to replicate in backup volume 124 the change made to primary volume 122. In one example implementation, primary volume 122 and backup volume 124 may be out of synchronization for a short period of time between owner SPU 120A completing the change to primary volume 122 and backup SPU 120B replicating the change in backup volume 124.

Primary volume 122 and backup volume 124 can fall out of synchronization and require resynchronization if owner 120A or backup 120B fails or otherwise becomes unavailable. If backup SPU 120B fails or otherwise becomes unavailable, owner 120A can continue to provide storage services for volume 122 as an unmirrored volume. However, when backup 120B returns to service, the backup copy of volume 122, i.e., volume 124, may not reflect all changes to primary volume 122 that may have occurred while backup SPU 120B was unavailable, and a resynchronization process may be required. Failure of the owner 120A can cause the backup 120B to take over ownership of volume 122, i.e., SPU 120B can begin presenting primary volume 122 to clients using the data of backup volume 124 so that SPU 120B can process new service requests targeting locations in volume 122. At that point, rolls of SPUs 120A and 120B are reversed, i.e., SPU 120B becomes the owner and SPU 120A becomes a (failed) backup. When SPU 120A fails and later comes back up, SPU 120A may at least start off as a backup that needs to be resynchronized to establish full redundancy. Without loss of generality, the following description of resynchronization processes uses the convention that the backup, e.g., SPU 120B, is missing data although the roles of owner and backup may be swapped if SPU 120A was unavailable.

A resynchronization process requires transmission of all still-relevant data that the current owner 120A wrote to its storage 150A while the backup 120B was unavailable. This still-relevant data is sometimes referred to herein as the resynchronization data. In the case of where a replication relationship is first being established, e.g., when a new storage node is being added or assigned to backup the primary volume 122, the resynchronization data may include all data of primary volume 122. To avoid disruption of storage services, the resynchronization process needs to identify, transfer, and process the resynchronization data even while owner 120A and backup 120B may be processing new service requests for clients. Transferring and processing the resynchronization data puts an additional burden on both the owner and backup SPUs 120A and 120B, which could adversely affect the performance of SPU 120A or 120B or the whole storage platform 100. Thus, the transfers of resynchronization data need to be sensitive to the load on storage platform 100 and particularly the loads on the owner and backup SPUs 120A and 120B. When storage platform 100 is idle, the resynchronization process should proceed as fast as possible. But when storage platform 100 (or particularly SPU 120A or 120B) is busy, the speed of the resynchronization process may need to be stepped down so as not to interfere with storage services or cause performance of storage platform 100 to degrade below a desired level. In accordance with an aspect of the current disclosure, the speed of a resynchronization process may be repeatedly adjusted based on the workloads of the owner 120A and the backup 120B.

In one example of the current disclosure, each SPU 120A or 120B tracks its recent workload in an activity history 148A or 148B. The recent workload of owner and backup storage nodes 120A and 120B can then be used to determine the speed at which the resynchronization data needs to be transferred from the owner 120A to the backup 120B. In one example, the speed of a resynchronization process is regulated by limiting the amount resynchronization data that may be transmitted during a given interval of time.

Figure 2:
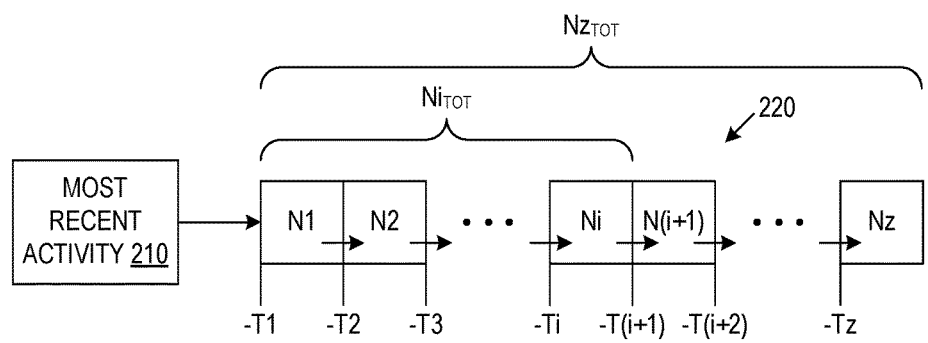
FIG. 2 illustrates a data structure for an activity history in accordance with an example of the present disclosure.

FIG. 2 illustrates an example process and data structure that a storage node may use to record or monitor an activity history. For the example of FIG. 2, the storage node may update a most recent activity value 210 every time the storage node is requested to, is processing, or completes an activity such as a service request. Most recent activity value 210 may, for example, be a count that the storage node increments each time the storage node receives a new service request. In another example, most recent activity value 210 may be a score that the storage node changes each time the storage node begins an activity, where each change to most recent activity value 210 may differ in size depending on the type of activity, an amount of data being processed, or an expected time required to complete the activity.

In yet another example, the storage node determines or calculates most recent activity value 210 based on an accumulation or percentage of the idle time or use of a processor, e.g., processing module 130A or 130B in SPU 120A or 120B, or based on utilization the data network, e.g., data network 170, of the storage platform during a time interval.

The storage node records and resets most recent activity value 210 at regular time intervals, for example, every second or some other period selected based on factors such as the time that the storage node requires to complete a typical service request or transmission times for data. The storage node, at the end of each recurring time interval or when "clocked," may save the most recent activity value 210 into one of a set of buckets 220, reset most recent activity value 210, and begin determining the most recent activity value 210 for the next time interval. The set of buckets 220 may be memory locations that record or store a fixed number of the most recent full-interval values of activity metric value 210. For example, the set of buckets 220 may logically act as a shift register, and each time the storage node adds a new value to the set of buckets 220, an oldest value Nz is discarded to make room for the newest value Ni. In one specific example, bucket set 220 maintains a total of thirty activity values N1 to Nz where a new value shifts in (and an oldest value shifts out) every second.

The storage node can use recorded activity values N1 to Nz to estimate or extrapolate an expected amount of activity that storage node may have during a coming time interval and to determine how much resynchronization activity may be performed during the coming time interval. In the example of FIG. 2, the storage node may evaluate the newest activity value N1, an intermediate activity value $Ni_{TOT}$ that accumulates or averages the i newest activity values N1 to Ni, and an accumulated or averaged (weighted or not) activity value $Nz_{TOT}$ based on all stored activity values N1 to Nz. For example, activity value N1 may indicate the amount of activity in the storage node during the last second, intermediate activity value $Ni_{TOT}$ may indicate the amount of activity in the storage node during the last five seconds, and activity value $Nz_{TOT}$ may indicate the amount of activity in the storage node during the last thirty seconds. More generally, the storage node can use activity values N1 to Nz to determine an activity or availability score or metric indicating how much fast resynchronization processing should proceed during a next time interval.

Figure 3:
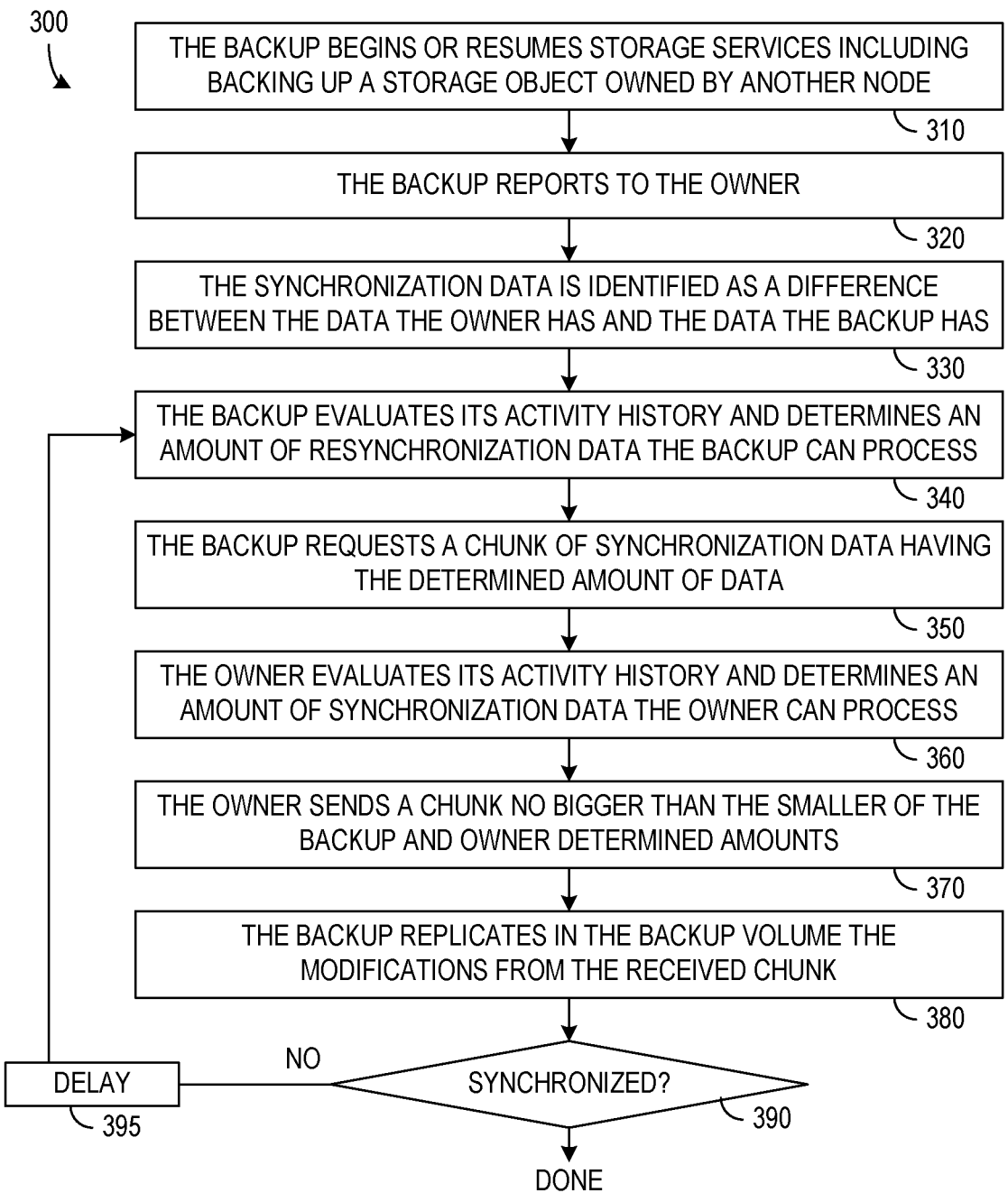
FIG. 3 is a flow diagram of a resynchronization process in accordance with an example of the present disclosure.

FIG. 3 is a flow diagram of a resynchronization process 300 in accordance with an example of the present disclosure for a backup storage node to resynchronize a backup volume that the backup storage node maintains with a primary volume that an owner storage node provides. Resynchronization process 300 may be used, for example, when a backup storage node returns to service or when a storage node is newly assigned to back up a primary volume. In an initial process 310, the backup storage node begins or resumes storage services including replication of the primary volume that the owner storage node owns. For example, a failed backup 120B of FIG. 1 may be returning to service, or backup 120B may be newly configured to maintain backup volume 124 that mirrors primary volume 122 owned by owner 120A. Throughout process 300, the backup may be fulfilling service requests for one or more volumes that the backup owns, and the backup may be performing resynchronization operations for one or more other backup volumes that the backup maintains. Additionally, once the backup is ready, new data arriving at the owner may be replicated as normal at the backup, while the backup is also fetching resynchronization data to catch up and resynchronize the backup volume with the active primary volume.

The backup, in a process 320, reports to the owner, and the owner and the backup, in a process 330, may communicate with each other to identify all the resynchronization data that the backup currently needs for synchronization of the backup volume with the primary volume. In general, the resynchronization data is the data that the owner stored for the primary volume but that is missing from the backup copy. In one example, the backup storage node identifies a last modification that the backup storage node made to the backup volume, and the owner storage node identifies all modifications made to the primary volume since the last modification to the backup volume. As described further below, identification of resynchronization data may use generation numbers that the owner assigns to each modification made to any portion of the primary volume. Durning normal operation, the owner can send the generation number of a modification to the backup with each request that the backup replicate the modification on the backup volume. In which case, the resynchronization data includes modifications that the owner made that were not replicated by the backup and where not later rewritten by the owner. Through information exchanged, process 330 allows both the owner and the backup to identify the resynchronization data.

The backup in an evaluation process 340 uses its activity history to determine or select an amount of the resynchronization data that the backup can process during a next time interval without significant adverse impact on the storage services that the backup (or the storage platform) provides. In this case, the activity history may include service requests that the backup has begun for volumes that the backup owns from which the backup can determine an expected or current workload, e.g., the number of service requests that the backup will need to process during a next time period. The backup may then classify the determined workload as one of a set of classifications, e.g., a heavy workload, a moderate workload, a light workload, or idle. A lookup table may provide for each classification a corresponding set of parameters that define a speed for a resynchronization process that will not cause client service to fall below a desired service level at the determined workload. For example, the parameters for each workload classification may indicate an amount of data, e.g., a number of blocks or pages of data, to be sent in a chunk of resynchronization data and indicate a time or delay before the backup should requests the chunk or a next chunk. Evaluation process 340 may yield a total amount of resynchronization data that the backup can process during the delay time without significant adverse change in the performance of the backup or the whole storage platform.

The backup storage node in a request process 350 sends to the owner storage node a request for a chunk of the resynchronization data. The backup may delay sending of the request for the delay time associated with the determined workload classification. The size of the chunk requested may be equal or less than the amount that the backup determined it can process in the delay time while also keeping storage performance of client services at or above a desired level. In some cases, the backup may be undertaking multiple resynchronization operations for different backup volumes, and the backup may allocate the selected or calculated amount of resynchronization data among the ongoing resynchronization operations. The backup may conduct the multiple resynchronization operations sequentially, in parallel, or in an interleaved fashion.

The owner in a process 360 receives the request from the backup and uses the owner's activity history to select or determine an amount of the resynchronization data that the owner can retrieve and send without significant adverse impact on the storage services that the owner provides, e.g., while also keeping storage performance of client services at or above a desired level. The owner, like the backup, may determine and classify a current or expected workload of the owner, and based on the workload classification lookup and select an amount of resynchronization data the owner can process without causing performance of client services below a desired level. In the example of process 300, the owner in a transmission process 370 sends that amount of resynchronization data that the backup requested unless the owner determines that sending the requested amount might adversely affect other storage services, particularly storage services that the owner provides. As a result, the amount of resynchronization data the owner sends in a chunk during transmission process 370 may be limited to be no more than the lesser of the amount the backup selected/requested based on the current workload of the backup and the amount the owner selected based on the current workload of the owner. The owner like the backup may simultaneously be involved in multiple resynchronization operations for owned volumes or backup volumes that the owner maintains, so that the owner may allocate the determined-safe amount of resynchronization data among multiple resynchronization operations. In any case, a transmission process 370 sends to the backup a chunk of resynchronization data that is no larger than the smallest of the chunk the backup requested and the amount that the owner determined will not significantly harm performance. The chunk of resynchronization data does not need to be sent as a single transmission, and in one example, a chunk of resynchronization data includes one or more blocks or pages of data sent to the backup in a series of separate transmissions, each including replication instructions for the block or page.

The backup in a replication process 380 replicates in the backup volume all modifications (if any) provided in the chunk that the owner sent to the backup. In a decision process 390, the backup determines whether the chunk of resynchronization data last sent from the owner completes the resynchronization process 300. In not, process 300 returns to the history evaluation process 340 where the backup calculates or selects an amount of resynchronization data to request in the next chunk. The backup may perform an optional delay 395 of the return to history evaluation process 340 based on the delay time determined for the last chunk. Using process 300, the size and timing of each chunk of resynchronization data sent may be adaptively adjusted based on current activity (or expected activity determined from recent activity history) of the owner and backup, so that the speed of resynchronization is adaptively and dynamically adjusted.

Figure 4:
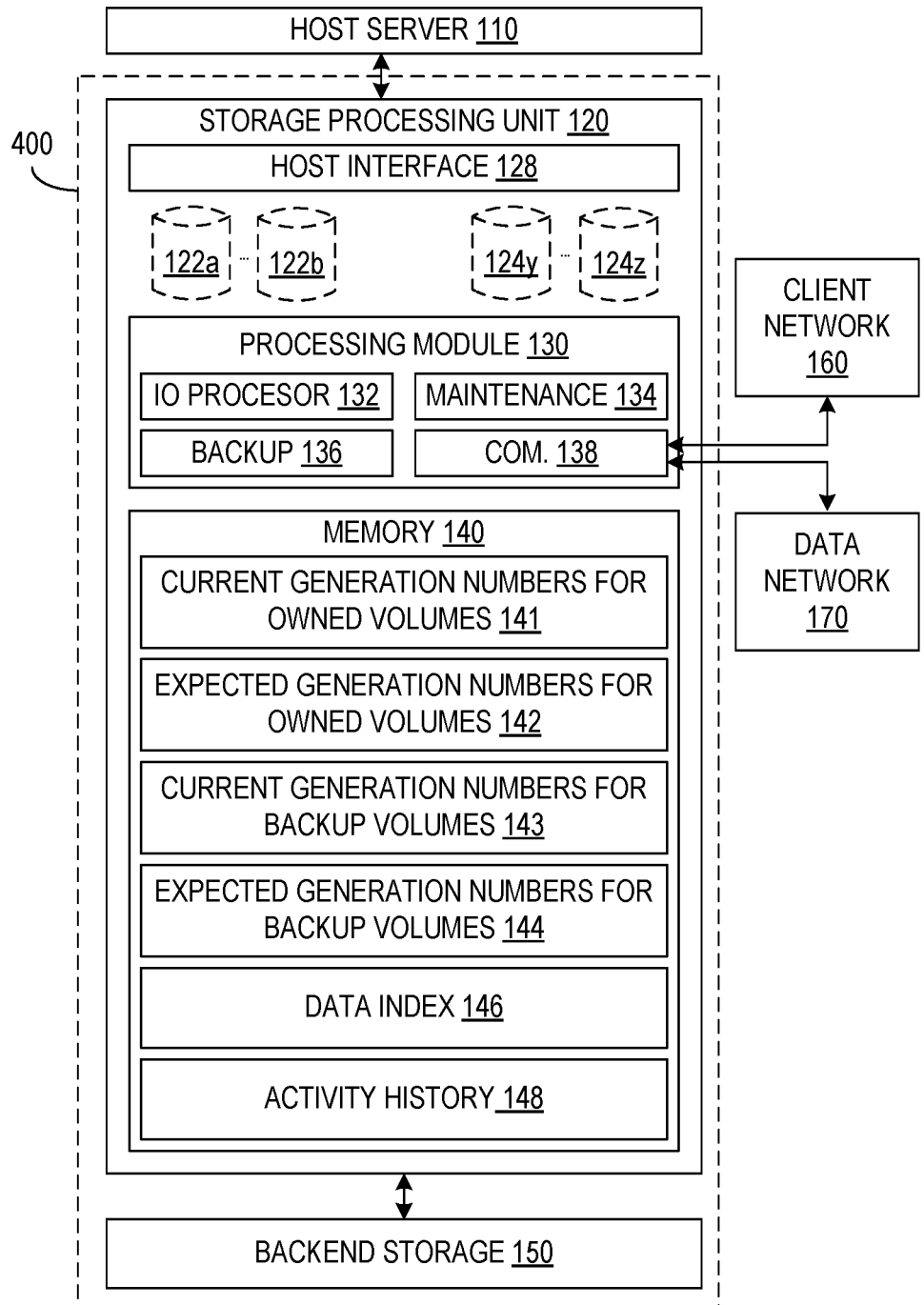
FIG. 4 is a block diagram showing a storage node in accordance with an example of the present disclosure.

Storage nodes may use generation numbers assigned to modifications of a primary volume to identify the resynchronization data needed to resynchronization the primary volume and a backup volume. FIG. 4 is a block diagram that shows a more specific example of a storage node 400 that employs generation numbers and that may be one of multiple storage nodes within a cluster storage platform in accordance with an example of the present disclosure. Storage node 400, which includes an SPU 120 and backend storage 150, provides storage services relating to a set of virtual volumes 122a to 122b. SPU 120 thus owns volumes 122a to 122b in that SPU 120 is normally responsible for fulfilling service requests that are directed at locations in any of volumes 122a to 122b. In addition to owned volumes 122a to 122b, SPU 120 may maintain one or more backup volumes 124y to 124z that are intended to be a replica or copy virtual volumes owned by one or more other storage nodes in the storage platform including storage node 400. As described further below, one or more of backup volumes 124y to 124z may be incomplete copies to the extent that the owner (not shown) may have completed one or more IO requests that SPU 120 has not yet replicated.

SPU 120 controls or uses its backend storage 150 to physically store the data associated with virtual volumes 122a to 122b and backup volumes 124y to 124z. SPU 120 in the illustrated example includes a processing module 130 with memory 140. Memory 140 may provide general purpose memory for processes that processing module 130 executes and may particularly store one or more data indexes 146 for tracking where data corresponding to volumes 122a to 122b and 124y to 124z are physically stored in its backend media 150. Data index 146 may, for example, be a key-value store or database in which each entry has a key and a value. The key in each entry may include a volume ID of a target virtual volume, an offset or address to a block or page in the target virtual volume, and a generation number for a modification request that changed or wrote the block corresponding to that offset or address in the target virtual volume. The value in each entry in data index 146 indicates a physical location in storage 150 where the write data of the IO request is stored.

Processing module 130 may include one or more processors or processing cores to execute software or firmware to implement an Input/Output (10) processor 132 and a maintenance module 134. IO processor 132 may be used to process service requests such as read and write requests targeting blocks in virtual volumes 122a to 122b owed by the SPU 120 and to update backup volumes 124y to 124z in response to update or replication instructions to synchronize backup volumes 124y to 124z with their respective primary volumes in other storage nodes. Maintenance module 134 may perform operations such as garbage collection to ensure that physical storage 150, data index 146, and other resources of SPU 120 are efficiently used and maintained. More generally, SPU 120 may provide storage services and functionality such as write and read operations, compression, deduplication, encryption, mirroring, remote and local access to data, disaster recovery and local and/or cloud backup. U.S. Pat. App. Pub. No. 2021/0224161, entitled "Efficient IO Processing in a Storage System with Instant Snapshot, Xcopy, and Unmap Capabilities," and U.S. Pat. App. Pub. No. 2021/0224236, entitled "Primary Storage with Deduplication," further describe some implementations of the data services that SPU 120 may provide.

SPU 120 has a communications module 138 that uses high speed data links, e.g., one or more parallel 25 GB/s Ethernet links, to connect to a data network 170 and through data network 170 to the cluster of SPUs sometimes referred to as a pod of SPUs. Communications module 138 may further support communications through a client network 160 that may also connect to host server 110. Client network 160 may include a connection through a firewall to a public or wide area network, e.g., the Internet, and a cloud-based management infrastructure (not shown) may remotely access SPU 120 and other nodes in the same pod as SPU 120, for example, to configure the storage platform including node 400.

SPU 120 provides an interface that exposes the virtual volumes 122a to 122b to storage operations such as writing and reading of blocks or pages of data at virtual locations in virtual volumes 122a to 122b. SPU 120 may present storage volumes 122a to 122b to host server 110 via SCSI (small computer system interface) target, NVMe (nonvolatile memory express) virtual target, or other data interface. Backend storage 150 provides the physical storage of data patterns of data written to virtual volumes 122a to 122b and backup volumes 124y to 124z. Backend storage 150 may include one or more storage devices, e.g., HDDs, SSDs or NVM, installed in host server 110, connected through an interface (e.g., a RAID card) of the host server 110, or connected directly to the SPU 120. In some implementations, each storage device providing backend storage 150 is only visible to SPU 120. In particular, the CPUs, OS, firmware, and baseboard management controllers (BMCs) of host server 110 cannot see or directly access some or all of storage 150. Host server 110 and storage clients may instead request data services targeting pages of the virtual volumes 122a to 122b owned by SPU 120 or targeting any shared volumes that other storage nodes in the cluster storage system may own.

A read or write request to SPU 120 may identify a storage location by a volume number (also referred to as a volume ID) of a target one of virtual volume 122a to 122b and an offset to or address of a location of affected data block or page in the targeted virtual volume. A storage client may send a service request targeting any of virtual volumes 122a to 122b to storage node 400 or to other storage nodes if the target virtual volume is shared. Wherever service requests are initially sent, SPU 120 generally processes all service requests targeting any of virtual volumes 122a to 122b and forwards any other service requests to the storage nodes that owns the volumes targeted.

In some examples of the present disclosure, SPU 120 tags each modification request targeting any of volumes 122a to 122b with a generation number that uniquely distinguishes the modification request from other modification requests targeting the same one of volumes 122a to 122b. For example, IO processor 132, which receives and processes modification requests, updates, e.g., increments, a current generation number 141 kept for the targeted volume and assigns the incremented value as the generation number of the modification request. As a result, different modification requests (whether to the same or different virtual locations in any of volumes 122a to 122b) are easily distinguishable using a volume ID and the generation number of the modification requests.

SPU 120, in the illustrated implementation, also maintains in memory 140 expected generation numbers 142 for respective volumes 122a to 122b that SPU 120 owns. Each expected generation number 142 corresponds to a generation number such that all IO requests with generation number lower than that expected generation number have been completed on both the primary and backup storage nodes and have been acknowledge to the client requesting the service. Typically, upon receiving a modification request to a target one of volumes 122a to 122b, SPU 120 increments the current generation number 141 associated with the target volume and assigns the current generation number to the modification request, and SPU 120 may later update the expected generation number 142 for the target volume in response to an acknowledgment from the storage node that is the backup for the target volume. Any of expected generation numbers 142 that differs from a corresponding current generation number 141 indicates that the backup storage node has not yet acknowledged that replication of the modification on the backup volume is complete. SPU 120 stores current generation numbers 141 and expected generation numbers 142 for the virtual volumes 122a to 122b in a persistent, non-volatile portion of its memory 140 for availability after SPU 120 restarts.

SPU 120 may also maintain in its memory 140 current generation numbers 143 and expected generation numbers 144 for backup volumes 124y to 124z that the SPU 120 maintains. In one example, SPU 120 may receive replication instructions targeting one of backup volumes 124y to 124z and requesting that SPU 120 replicate on the backup volume the modification of a primary volume that the target one of backup volume 124y to 124z replicates. The replication instructions may include the generation number that the owner node assigned to the modification of the primary volume. SPU 120 updates its current generation number 143 for the target backup volume upon replicating a modification request having a generation number greater than the value of the current generation number 143 for the target one of backup volumes 124y to 124z. SPU 120 updates its expected generation number 144 for the target one of backup volumes 124y to 124z upon replicating a modification request having a generation number equal to the expected generation number 144 for the target one of backup volumes 124y to 124z. Accordingly, for backup volumes 124y to 124z, SPU 120 has completed all replications operations having generation numbers older than the expected generation numbers 144 for the respective backup volumes 124y to 124z. The current generation number 143 for a backup volume 124y to 124z being greater that the corresponding expected generation number 144 for the backup volume indicates that SPU 124 also completed one or more of the modification requests having one or more generation numbers newer than the expected generation number 144 but one or more modifications requests having generation numbers between the current generation number 143 and the expected generation number 144 were not completed.

SPU 120 upon failure and recovery can contact the storage nodes owning the primary volumes replicated by backup volumes 124y to 124z. The resynchronization data that SPU 120 then needs to synchronize backup volumes 124y to 124z with their respective primary volumes may be determined using the current and expected generation numbers 143 and 144 that SPU 120 has for the backup volumes 124y to 124z and the current and expected generation numbers that the owner storage nodes have for the respective primary volumes. For example, SPU 120 may need modification data corresponding to all generation numbers from the expected generation number 144 that SPU 120 has for a backup volume to the current generation number that the owner storage node has for a corresponding primary volume. The current generation number 143 for a backup volume 124y to 124z being greater that the corresponding expected generation number 144 indicates SPU 124 completed one or more of the modification requests having generation number newer than the expected generation number 144, and SPU 120 does not need modification data for the completed replication operations. Also, some later modifications to a primary volume may have overwritten a modification that SPU 120 has not replicated. SPU 120 may not need to replicate overwritten modifications or modifications that SPU 120 already replicated. PCT Pub. No. WO2021174065A1, entitled "Reestablishing Redundancy in Redundant Storage" describes techniques that may be used to identify unnecessary modification data and necessary resynchronization data and to reduce the size of the resynchronization data that SPU 120 may need to resynchronize a backup volume with a primary volume.

Each of modules disclosed herein may include, for example, hardware devices including electronic circuitry for implementing the functionality described herein. In addition, or as an alternative, each module may be partly or fully implemented by a processor executing instructions encoded on a machine-readable storage medium.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although some implementations have been disclosed, these implementations are only examples and should not be taken as limitations. Various adaptations and combinations of features of the implementations disclosed are within the scope of the following claims.

What is claimed is:

1. A resynchronization process comprising:
   (i.) updating a first activity history for each first activity in a series of the first activities conducted in a storage system;
   (ii.) transmitting a data chunk from an owner storage node that owns a storage object to a backup storage node that maintains a backup storage object, the data chunk having a size determined using the first activity history, the data chunk representing changes that the owner storage node made to the storage object;
   (iii.) the backup storage node replicating in the backup storage object the changes represented in the data chunk; and
   (iv.) repeating (i.), (ii.), and (iii.) until the backup storage object is a replica of the storage object, wherein updating the first activity history comprises the backup storage node updating the first activity history, and the series of the first activities comprises storage operations that the backup storage node begins.

2. The process of claim 1, wherein updating the first activity history further comprises the backup storage node determining a plurality of activity values respectively corresponding to a plurality of time intervals, each of the activity values indicating an amount of activity the backup storage node conducted or begun during the time interval corresponding to that activity value.

3. The process of claim 2, wherein the time intervals include a first interval, a second interval that is larger than and includes the first interval, and a third interval that is larger than and includes the second interval.

4. The process of claim 1, further comprising the owner storage node updating a second activity history for each second activity in a series of the second activities conducted by the owner storage node.

5. The process of claim 4, further comprising:
   the backup storage node requesting that the owner storage node transmit a first amount of data for the resynchronization process, the backup storage node selecting the first amount using the first activity history; and
   the owner storage node using the second activity history to select a second amount of data, the size of the data chunk being no greater than a lesser of the first amount of data and the second amount of data.

6. The process of claim 5, wherein the backup storage node selects the first amount of data to keep storage performance of the backup storage node above a desired level in the event that the backup storage node processes the first amount of resynchronization data while processing a workload indicated by the first activity history.

7. The process of claim 6, wherein the owner storage node selects the second amount of data to keep storage performance of the owner storage node above a desired level in the event that the owner storage node processes the second amount of resynchronization data while processing a workload indicated by the second activity history.

8. The process of claim 1, wherein for each repetition of (ii.) transmitting the data chunk, the process further comprises:
   the backup storage node sending a request that the owner storage node transmit a first amount of data for the resynchronization process, the backup storage node selecting the first amount using the first activity history, the transmitting of the chuck data chunk being in response to the request; and
   the backup storage node selecting a delay using the first activity history, repetitions of sending the request being separated by the delay.

9. A resynchronization process comprising:
   the backup storage node using an activity history of the backup storage node to select a first amount of resynchronization data for a backup storage object that the backup storage node maintains as a replica of a storage object owned by an owner storage node;
   the backup storage node requesting that the owner storage node transmit to the backup storage node the first amount of the resynchronization data;
   the owner storage node using an activity history of the owner storage node to select a second amount of the resynchronization data;
   the owner storage node transmitting to the backup storage node a data chunk containing a third amount of the resynchronization data, the third amount being no larger than a lesser of the first amount and the second amount;
   the backup storage node replicating in the backup storage object changes represented in the data chunk; and
   repeating the preceding steps until the backup storage object is a replica of the storage object.

10. The resynchronization process of claim 9, further comprising before each repetition of the requesting of the data chunk, the backup storage node using the activity history of the backup storage node to select a delay, and delaying, by at least the selected delay, the repetition of the requesting that the owner transmit the data chunk.

11. A storage platform comprising:
    a first storage node providing storage services for a first storage object, the first storage node being configured to maintain a first activity history based on storage operations that the first storage node performs; and
    a second storage node maintaining a second storage object, the second storage node being configured to maintain a second activity history based on storage operations that the second storage node performs, wherein the storage platform is configured to perform a resynchronization process comprising:
    the first storage node using the first activity history to select a first amount of resynchronization data that the first storage node can process while maintaining storage service performance above a target level;
    the second storage node requesting that the first storage node transmit a second amount of resynchronization data for the resynchronization process, the second storage node using the second activity history to select the second amount;

the first storage node transmitting a data chunk to the second storage node, a size of the data chunk being no greater than a lesser of the first amount of data and the second amount of data, the data chunk representing changes that the first storage node made to the first storage object; and the second storage node replicating in the second storage object the changes that the data chunk represents.

12. The storage platform of claim 11, wherein the second amount of the resynchronization data is an amount that the second storage node determined can be processed while the second storage node maintains storage service performance above a second target level.

* * * * *